Oct. 12, 1948.                    T. LOEW                    2,451,103
                     CENTRIFUGAL CASTING APPARATUS
                         Filed March 18, 1946
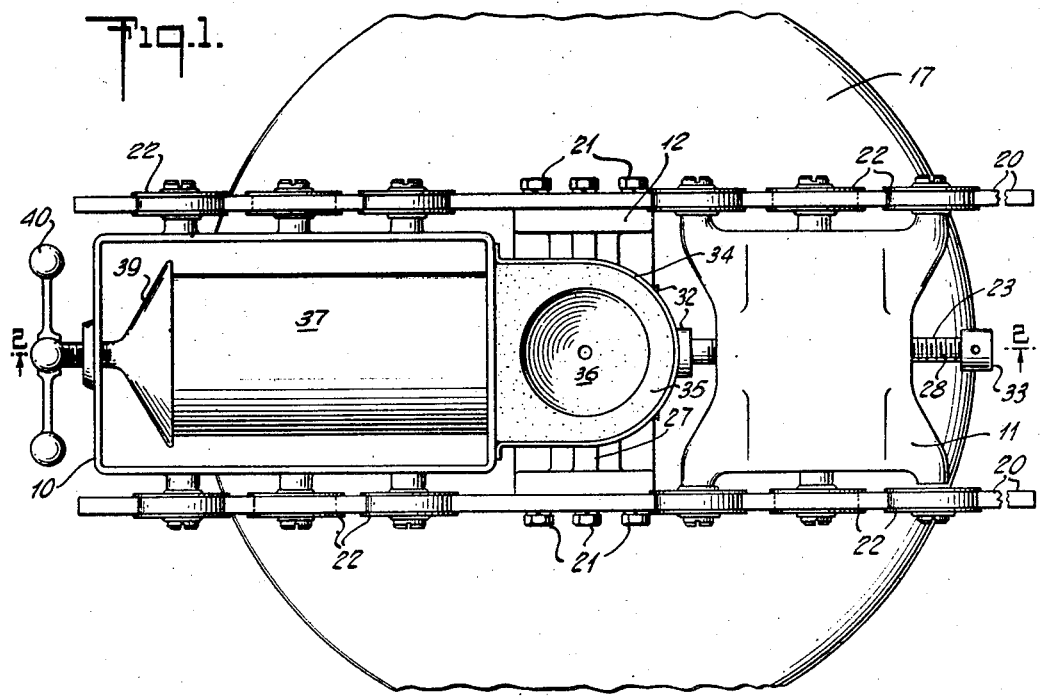
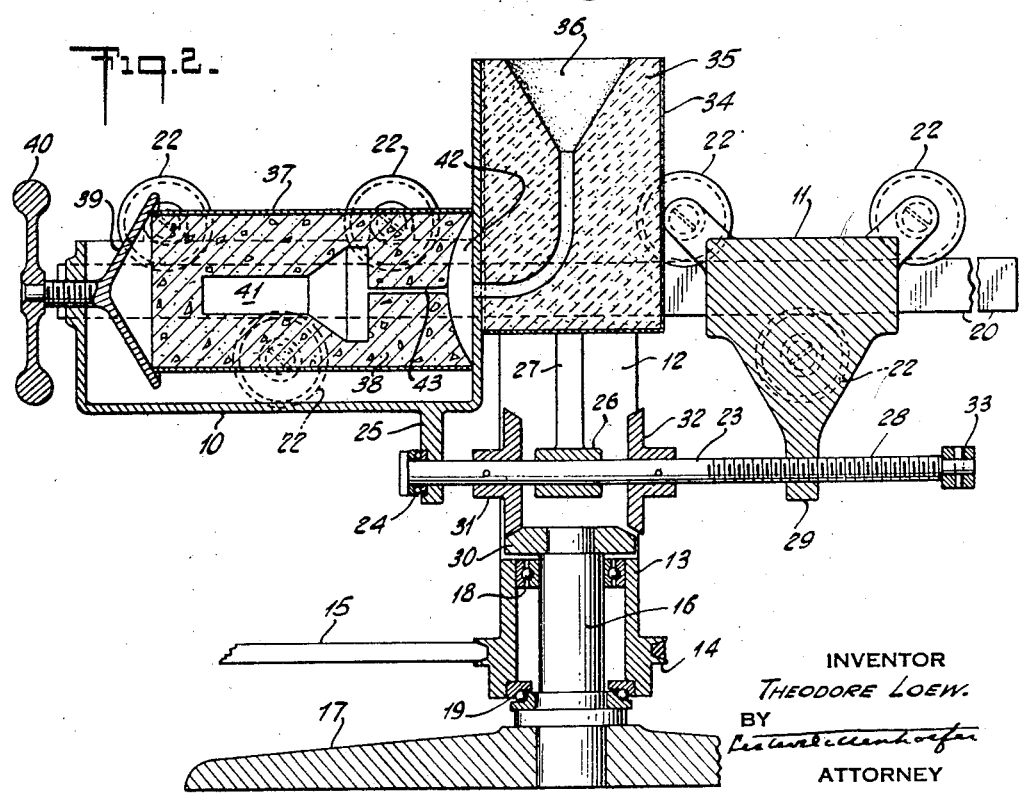
INVENTOR
THEODORE LOEW.
BY
ATTORNEY Patented Oct. 12, 1948

2,451,103

UNITED STATES PATENT OFFICE 2,451,103

CENTRIFUGAL CASTING APPARATUS

Theodore Loew, New York, N. Y.

Application March 18, 1946, Serial No. 655,285

3 Claims. (Cl. 22—65)

This invention relates to improvements in centrifugal casting apparatus of the type used in the jewelry, dental, and other arts.

Such machines heretofore have been limited generally to use for casting small and lightweight articles, or parts thereof. The limitation as to weight is due mainly to the fact that as the molten metal flows into the rapidly rotating mold changes in weight occur that create an unbalanced condition and cause vibration of the apparatus. To avoid this, it has been proposed to provide the machine with a manually adjustable counterweight that is set in predetermined position before rotation of the machine is started.

The principal object of this invention is to overcome the defects of the prior art machines by providing a centrifugal casting apparatus having automatic balancing means.

Other objects and advantages of the invention will appear from the following description thereof, reference being had to the accompanying drawings, in which:

Fig. 1 is a top plan view of the apparatus; and,

Fig. 2 is a longitudinal sectional view on the line 2—2 of Fig. 1.

The framework of the machine, which carries the casting 10 and the counterweight 11, comprises two upright members 12—12, one at each side of the machine, connected by cross-members, and a central hollow member or hub 13 provided with a sheave 14 for a driving belt 15 or the like.

The hub member 13 of the framework is rotatably mounted on a vertical axis or post 16 fixed to the base 17. The framework is rotated through the belt by means of an electric motor or other suitable driver (not shown). To minimize friction, the hub member 13 is mounted on post 16 by means of the anti-friciton bearings 18 and thrust bearings 19.

Horizontal tracks 20 are attached by bolts 21 to the upper ends of the upright frame members 12. The casting head 10 and the counterweight 11 are each mounted to roll or slide on the tracks, as by means of the rollers 22.

A horizontal shaft 23 is supported at one end by a bearing 24 carried on a flange 25 depending from the casting head, and at an intermediate point by a bearing 26 formed at the lower end of the framework cross-member 27. The shaft is free to rotate axially but is constrained against endwise movement by the bearing 24. The opposite end of the shaft is threaded at 28 and engages the internal screw-threads of the boss or nut 29 at the lower end of the counterweight.

Fixed to the upper end of post 16 is a friction disk 30, and fixed to the shaft 23 are two friction disks 31 and 32. The edges of the disks may be beveled as shown. When the system is in balanced condition both disks 31 and 32 will be out of effective frictional contact with the collar 30, but in any state of unbalance of the system one or the other disks 31, 32 will be brought temporarily into rolling frictional contact with the disk 30. It will be seen that as the machine rotates, should one or the other of disks 31—32 come into frictional contact with the fixed disk 30, axial rotation of shaft 23 will be effected in one direction or the other. A collar or stop 33 may be applied to the threaded end of the shaft to prevent the shaft from accidentally unscrewing from the boss or nut 29.

Attached to or forming a part of the casting head 10 is a receptacle or hopper 34 having a liner or block 35 of refractory material formed with a funnel-shaped opening 36 for receiving the molten metal to be cast.

A flask 37, containing an investment 38, is detachably held in position in the casting head by a screw-clamp 39 furnished with a hand-wheel 40. The investment has one or more mold cavities 41 which are formed in the usual manner, that is, by means of a wax pattern which is burned out to leave a cavity corresponding to the shape of the pattern. During rotation of the machine molten metal flows, by gravity and centrifugal force, from the hopper to the mold cavities through the gate 42 and sprues 43.

The manner of operation is as follows: Assuming the machine to be in the unbalanced condition shown in the drawings, particularly Fig. 2, that is with the disk 31 in frictional engagement with the disk 30, and assuming further that the direction of rotation of the framework carrying the casting head and counterweight is contraclockwise, then disk 31 will roll on disk 30 causing the shaft 23 to turn axially so as to move the counterweight towards the casting head. Thus, the machine will be restored to a condition of balance, that is, to a condition in which the center of gravity of the rotating system substantially coincides with the axis of rotation. Similarly, if the disk 32 is brought into frictional rolling contact with disk 30, the shaft 23 will be caused to rotate in the opposite direction to move the counterweight away from the casting head. In this manner, any unbalanced condition created by flow of molten metal into the mold, or from any other cause, will be automatically corrected during operation of the machine, and vibration will be reduced to a minimum.

Various modifications in the construction herein described and illustrated may be made within the scope of the invention as defined in the claims.

What I claim is:

1. In a centrifugal casting machine, a horizontally rotatable member carrying a mold and a counterweight, the counterweight and mold being mounted on said member to move relatively toward and away from each other, means for feeding material to be cast into the mold during rotation of the machine, a horizontal shaft connecting the mold with the counterweight and in threaded engagement with the latter, a pair of vertical disks fixed to the shaft, a fixed horizontal disk disposed between the pair of vertical disks, one or the other of said vertical disks being adapted to contact the horizontal disk frictionally and to cause the shaft to rotate in one direction or the other to shift the position of the counterweight relative to the mold as the mass in the mold varies so as to maintain the center of gravity of the system substantially coincident with its axis of rotation.

2. In a centrifugal casting machine, a vertical axis, a framework mounted on the axis to rotate in a horizontal plane, a casting head supported at one end of the framework, a mold detachably secured to the casting head, a hopper attached to the casting head for feeding molten metal to the mold, a counterweight slidably mounted on the opposite end of the framework to move toward or away from the mold, a horizontal shaft connecting the mold with the counterweight and in threaded engagement with the latter, a pair of vertical disks fixed to the shaft, a fixed horizontal disk disposed between the pair of vertical disks, one or the other of said vertical disks being adapted to contact the horizontal disk frictionally and to cause the shaft to rotate in one direction or the other to shift the position of the counterweight relative to the mold as the mass in the mold varies so as to maintain the center of gravity of the system substantially coincident with its axis of rotation.

3. In a centrifugal casting machine, the combination with a carriage rotating horizontally about a vertical axis, of a mold and a counterweight movably mounted on the carriage, means for feeding material to be cast into the mold, means connecting the mold and counterweight to move one relatively toward or from the other during rotation of the carriage, and operating means to move said connecting means and so effect movement of the mold and counterweight relatively toward or from each other during the rotary movement of the carriage so as to maintain the center of gravity of the system substantially coincident with its axis of rotation as the weight of the material in the mold varies.

THEODORE LOEW.

REFERENCES CITED

The following references are of record in the file of this patent:

UNITED STATES PATENTS

| Number | Name | Date |
|---|---|---|
| 1,976,654 | Carpenter | Oct. 9, 1934 |
| 2,192,043 | Hooper | Feb. 27, 1940 |
| 2,202,473 | Vickers | May 28, 1940 |
| 2,257,475 | Metz | Sept. 30, 1941 |